| United States Patent [19] | [11] 4,055,850 |
|---|---|
| Prakash | [45] Oct. 25, 1977 |

[54] CAPACITOR WITH ELECTRODE CONTAINING NICKEL

[75] Inventor: Sri Prakash, Simpsonville, S.C.

[73] Assignee: Union Carbide Corporation, New York, N.Y.

[21] Appl. No.: 643,755

[22] Filed: Dec. 23, 1975

[51] Int. Cl.² .............................................. H01G 1/01
[52] U.S. Cl. .................................. 361/305; 106/1.13; 106/1.14; 252/514; 361/321
[58] Field of Search ........................... 252/514; 106/1; 317/258; 428/434; 361/305, 321

[56] References Cited

U.S. PATENT DOCUMENTS

| 3,854,957 | 12/1974 | Larry | 106/1 |
| 3,872,360 | 3/1975 | Sheard | 317/258 |
| 3,913,201 | 10/1975 | Schreiner | 252/514 |

Primary Examiner—E. A. Goldberg
Attorney, Agent, or Firm—Frederick J. McCarthy, Jr.

[57] ABSTRACT

Improved metallizations for formation of capacitor electrodes containing noble metal and nickel oxide.

2 Claims, 3 Drawing Figures

U.S. Patent     October 25, 1977     4,055,850

CAPACITOR WITH ELECTRODE CONTAINING NICKEL

This invention relates to metallizations for the formation of capacitor electrodes, particularly multilayer ceramic capacitors.

Metallizations used in the formation of capacitor electrodes are powders of finely divided noble metals which can be dispersed in an inert liquid vehicle for printing patterns on dielectric materials. Such metallizations are described in U.S. Pat. Nos. 3,763,409 and 3,872,360, which also disclose the use of additional ingredients with noble metals.

In view of the high cost of noble metals it is desirable to dilute the noble metal content in metallizations without detrimentally affecting the performance of the metallization and capacitors utilizing such metallizations as proposed in the prior art.

It is an object of the present invention to provide metallizations for the formation of capacitor electrodes which are dilute in noble metal content and which also result in the improvement of various properties of capacitors utilizing such metallizations without detrimentally affecting other properties of such capacitors.

Figure 1:
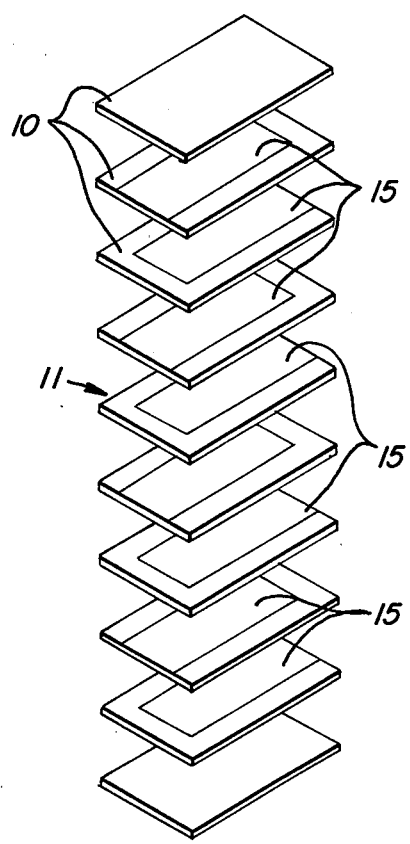
Figure 2:
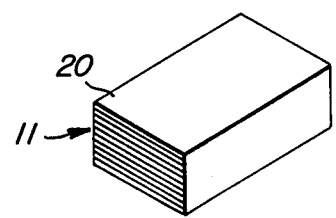
Figure 3:
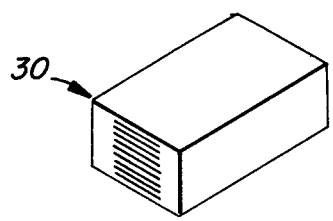

Other objects will be apparent from the following description and claims taken in conjunction with the drawing wherein FIG. 1 shows an unassembled stack of green unfired ceramic strips having appropriately arranged electrode patterns and FIG. 2 shows a multilayer capacitor arrangement resulting from the assembly of the ceramic strips of FIG. 1 and FIG. 3 shows a multilayer ceramic capacitor produced by firing the arrangement of FIG. 2.

A metallization in accordance with the present invention is a mixture of finely divided noble metal, i.e., gold, silver, palladium, platinum and alloys thereof, with finely divided nickel oxide wherein the ratio by weight of nickel calculated as elemental nickel, to the total weight of noble metal is from about 1/9 to ¼. In the case of a metallization containing NiO, in which nickel represents 78% by weight of the NiO, in order to provide the minimum nickel to noble metal ratio of 1/9, i.e., about 11.1%, the amount of NiO required is that which provides a nickel to noble metal ratio of 11.1 ÷ 0.78, i.e. about 14.1%.

In the practice of the present invention, finely divided noble metal or metals, suitably sized 0.5 to 10 microns, are mixed with nickel oxide, also suitably sized 0.5 to 10 microns. Nickel compounds which are thermally decomposable to NO are included in the expression "nickel oxide", e.g., nickel nitrates, acetates, carbonates, oxalates, and hydrates, thereof, and the like. The resulting powder is suitably mixed with an inert vehicle, e.g., cellulose acetate butyrate, cellulose acetate and other esters of higher alcohols, ethyl cellulose solutions, terpenes, terpineols, methacrylate esters, and acrylic polymer solutions to provide an ink containing about 40 to 60% by weight metal, preferably about 50% by weight.

In the practice of a particular embodiment of the present invention, a conventional green ceramic sheet suitable in the manufacture of multilayer capacitors is provided in a conventional manner, e.g., by slip casting a mix of a finely divided ceramic, such as barium titanate, calcium oxide, titanium dioxide, zirconium oxide, and mixtures thereof with resin, solvent and plasticizer. The cast sheet is dried and can be cut into strips, indicated at 10 in FIG. 1, with a pattern of electrodes indicated at 15, being provided on all but the top and bottom strips, by conventional screen printing practice. Additional cover sheets containing no electrode pattern can be used at the top and bottom of the capacitor. Alternately, a pattern of electrodes can be provided on the large sheet before cutting into the desired sized smaller strips. In the present invention, the electrode forming material, i.e., the ink, used in printing of the electrode patterns contains a metallization in accordance with the present invention as herein described.

The strips 10 are stacked in the configuration of FIG. 2, and the capacitor configuration is then fired to sinter the green ceramic into a polycrystalline mass and mature the metallization in the electrode patterns and provide a multilayer ceramic capacitor indicated at 30 in FIG. 3. Suitable firing temperatures are from 1000° C to 1400° C and suitable firing times are from 0.5 to 3 hours.

Multilayer ceramic capacitors thus provided, in addition to utilizing less noble metal, have improved properties as hereinafter described.

It has been discovered that, when nickel oxide is included in noble metal metallizations and a corresponding fraction of the noble metal alloy is removed, the anticipated advantage of greater electrode area per unit weight noble metal was indeed realized. Totally unexpectedly, a variety of properties of capacitor devices utilizing such metallizations were also improved. The improvements might be loosely grouped as "tending to greater stability", and took a variety of forms depending on the specific dielectric type employed capacitor construction. Three examples illustrate:

NPO-type capacitors prepared as described in Example I are selected for superior stability with varying temperature and bias voltage and unusually low losses. They are normally marginal, if anywhere, in high temperature insulation resistance. When the conventional all noble metal alloy electrode is replaced by an electroding ink in which 20% of the noble metal is replaced by nickel oxide, the K, TCC, d.f., and VCC are unchanged (to within experimental reproducibility), but the I.R. is improved by a factor of 3X to 10X as shown in Table I.

TABLE I

| EXAMPLE I | | | | | | | |
|---|---|---|---|---|---|---|---|
| | | Solids to | Firing | T.C.C. PPM/° C | | I.R. 125° C | |
| Dielectric* | Metallization | Vehicle | Temp. ° C | −55° C | +125° C | MΩ/μf | K 25° C |
| COG | 7.5Pt/22.5Pd/70Au | 53/47 | 1260 | 20 | −15 | 125 | 60 |
| COG | Pd | 50/50 | 1260 | 28 | 12 | 36 | 58 |
| COG | Pd | 50/50 | 1260 | 5 | 6 | 25 | 57 |
| COG | 7.5Pt/22.5Pd/70Au | 53/47 | 1177 | 29 | −19 | 40 | 60 |
| COG | 20Ni$_2$O$_3$/80Pd | 50/50 | 1177 | 27 | −20 | 230 | 59 |
| COG | 20Ni$_2$O$_3$/80Pd | 50/50 | 1288 | 2 | 5 | 500 | 58 |
| COG | 15Ni$_2$O$_3$85Pd | 50/50 | 1288 | 2 | 12 | >300 | 61 |
| COG | 22Ni$_2$O$_3$/78.5Pd | 50/50 | 1260 | 6 | 6 | >475 | 58 |

*Electronic Industries Association designation.

Additionally, X7R-type capacitors prepared as described in Examples II are chosen to offer a reasonable compromise between large capacitance per unit volume and excellent stability against environmental variables. They are frequently limited by relatively poor capacitance stability under bias-voltage and marginal high temperature insulation resistance. Nickel oxide substitution for noble metal in the metal metallizations for these dielectrics makes small but significant improvement precisely in these parameters as shown in Table II.

useful improvement in the electrode area per unit weight of noble metal were found as shown in Table IV. Similarly, Fe, Mn, and Co additions, as metals or oxides, do not offer benefits comparable to nickel oxide additions.

TABLE IV

EXAMPLE IV

| Dielectric* | Metallization | Solids to Vehicle | Firing Temp.° C | T.C.C. PPM/° C −55° C | T.C.C. PPM/° C +125° C | I.R. 125° C MΩ/μf | K 25° C |
|---|---|---|---|---|---|---|---|
| COG | 15Ni$_2$O$_3$/85Pd | 50/50 | 1260 | 2ppm/° C | 12ppm/° C | 300 | 61 |
| COG | 10Cu/90Pd[1] | 50/50 | 1260 | 20ppm/° C | −27ppm/° C | 125 | 52 |
| COG | 20Cu/80Pd[1] | 50/50 | 1260 | 11ppm/° C | 16ppm/° C | 90 | 54 |
| Z5U | 10Cu/90Pd[1] | 50/50 | 1260 | −53% | −56% | 600 | 5000 |
| Z5U | 10NiO/90Pd | 50/50 | 1260 | −4.5% | −39% | 200 | 5000 |

*Electronic Industries Association designation.
[1]50Cu/50Pd copper coprecipitate powder of −280 mesh size (U.S. Series) was blended with Metz No. 1 palladium powder to make these compositions.

Nickel oxide has been proposed as a modifier of dielectric properties in BaTiO$_3$-based capacitor dielectrics. Although Ni additions to dielectrics, as oxide, chloride or nitrate, do materially change dielectric properties, the changes are not the same in kind or degree as those

TABLE II

EXAMPLE II

| Dielectric* | Metallization | Solids to Vehicle | Firing Temp° C | ΔC, % −55° C | ΔC, % −55° C bias | ΔC, % +125° C | ΔC, % +125° C bias[1] | I.R. 125° C MΩ/μf | K 25° C |
|---|---|---|---|---|---|---|---|---|---|
| X7R | 7.5Pt/22.5Pd/70Au | 53/47 | 1260 | − 8.6 | −46.6 | − 8.3 | −43.5 | 400 | 1600 |
| X7R | 10Ni$_2$O$_3$/6.75Pt/ 20.25Pd/63Au | 50/50 | 1260 | −11.0 | −34.4 | −16.5 | −38.1 | 800 | 1500 |

*Electronic Industries Association designation
[1]100V bias applied is twice rated maximum voltage.

Also, Z5U-type capacitors prepared as described in Example III are designed for maximum volumetric efficiency near ambient temperature. They are usually highly unstable against temperature changes and bias voltages and are often vulnerable to high power losses.

produced by additions of Ni to the electrodes as shown in Table V for capacitors prepared as in Example V; e.g., improved TCC is accompanied by significantly lowered K at 25° C; I.R. is sometimes harmed rather than improved.

TABLE V

EXAMPLE V

| Dielectric* | Metallization | Solids to Vehicle | Firing Temp.° C | T.C.C.: −55° C | T.C.C.: +125° C | I.R. 125° C Mμ/μf | K 25° C |
|---|---|---|---|---|---|---|---|
| X7R | 7.5NiO/42.5Pd/50Ag | 50/50 | 1038 | − 8.6 | −12.2 | 1137 | 900 |
| X7R[1] | 50Pd/50Ag | 50/50 | 1038 | −30.4 | −12.4 | 217 | 800 |
| COG | 15Ni$_2$O$_3$/85Pd | 50/50 | 1260 | 2 | 12 | 300 | 61 |
| COG[2] | 7.5Pt/22.5Pd/70Au | 53/47 | 1260 | 40 | −19 | 170 | 60 |

*Electronic Industries Association designation.
[1]Added 2 parts by weight nickel oxide to 100 parts by weight dielectric
[2]Added 0.5 parts by weight nickel oxide to 100 parts by weight dielectric Nickel substitution for noble metal in the electrode metallization slightly depresses K at 25° C but greatly improves variation of K with temperature, significantly reduces d.f. and modestly improves bias voltage stability as shown in Table III. It is apparent that, if dielectric chemistry were optimized for this electrode system, even the slight loss of K could be avoided.

EXAMPLE I

Ceramic dielectric powders were slurried with 12% by weight plasticized polyvinyl alcohol and slip cast and dried to provide green ceramic tape about 45 microns thick. The dielectric powders were of the type available from the TAM Division of National Lead

TABLE III

EXAMPLE III

| Dielectric* | Metallization | Solids to Vehicle | Firing Temp. ° C | C, % −10° C | C, % +85° C | d.f. 25° C % | K 25° C |
|---|---|---|---|---|---|---|---|
| Z5U | PdO | 50/50 | 1288 | −40.5 | −36.2 | 3.0 | 5700 |
| Z5U | 15Ni$_2$O$_3$/85Pd | 50/50 | 1288 | 6.5 | −51.3 | 1.20 | 5100 |
| Z5U | PdO | 50/50 | 1260 | −20.8 | −29.5 | 1.75 | 5600 |
| Z5U | 15Ni$_2$O$_3$/85Pd | 50/50 | 1260 | 14.6 | −32.7 | 1.10 | 5000 |

*Electronic Industries Association designation.

Pd-Cu metallizations for capacitor electrodes have been proposed as economical alternatives to pure Pd. Cu substitutions in noble metals (rather than nickel oxide) have been investigated for capacitors prepared as in Example IV and neither measurable beneficial effects for the dielectric properties of the capacitor body, nor Company under the designation composition NPO 5038. These ceramic powders comprise primarily oxides of neodimium. Rectangular electrode patterns (about 6.0mm × 6.6mm × 5 microns thick) were screen printed on the green ceramic tape as illustrated in FIG.

1 using a 325 mesh (U.S. Series) stainless steel screen. The electrode ink was prepared by mixing metallizing powders of the compositions listed in Table I with ethyl cellulose as resin and pine oil as solvent and then was homogenized by being passed through a 3-roll mill. The printed green ceramic tape was cut into strips and stacked in a capacitor configuration as shown in FIG. 2. The capacitor configuration was arranged to have /8 printed electrodes, i.e., 17 active dielectric layers and, after firing, horizontal dimensions of 5.7mm × 6.0mm. The green ceramic sheet was designed to fire to a 28 microns thickness. The stacked electrode configuration was fired for about 2 hours in air at the temperatures indicated in Table I and the properties obtained are shown in Table I.

EXAMPLE II

The procedure of Example I was followed using dielectric powders of the type which yield capacitors designed X7R by the Electronic Industires Association. The ceramic powder used was formulated with about 83 weight per cent barium titanate, 7 weight per cent calcium stannate, and 10 weight per cent bismuth titanate from the materials commercially available from the TAM Division of National Lead Company. Properties of capacitors made from this ceramic powder and the metallizing powders shown in Table II are listed in Table II.

EXAMPLE III

The procedure of Example I was followed using dielectric powders of the type which yield very high dielectric constant ceramic bodies and capacitors characterized by the Electronic Industries Associates' designation Z5U. The ceramic powder comprised of 88 weight per cent barium titanate, 11 weight per cent calcium zirconate, and about 1 weight per cent of the oxides of neodymium, cerium, magnesium and titanium. The ceramic powders with the exception of neodymium oxide were obtained from TAM Division of National Lead Company. The neodymium oxide was purchased from Molybdenum Corporation of America. Properties of capacitors made from this ceramic powder and the metallizing powders shown in Table III are listed in Table III.

EXAMPLE IV

The procedure of Example I was followed using the dielectric materials of Examples I and III as shown in the first column of Table IV. Properties of capacitors made from these powders and the metallization powders shown in Table IV are listed in Table IV.

EXAMPLE V

The procedure of Example I was followed using the materials of Example I and Example II except for the addition of nickel oxide to the dielectric as indicated in Table V. Properties of the resulting capacitor are shown in Table V.

The properties listed in the foregoing tables were obtained by exposing the embedded electrodes of the capacitors by blast abrasion; conventional silver/glass formulations were applied and fired at 825° C to facilitate electrical contact to the capacitor bodies, and lead wires were attached using conventional solder-immersion. Electrical and environmental data were obtained using a Statham environmental chamber, Model #5060-3, an H-P model 4270-A capacitance bridge at 1000 Hz and a General Radio, Model 1864, megohmmeter. These are recorded in Tables I to V, and the calculation of K was based upon quantitative destructive microanalysis of the parts after electrical testing. Except as noted in the Tables, all electrode formulations defined in Tables I to V were fabricated by mixing elemental and alloy noble metal powders obtained from Metz Metallurgical and/or Engelhard Industries with nickel oxide obtained from Harshaw Chemicals, Inc. The last formulations in Tables II and IV and the first formulation in Table V do not contain nickel oxide within the range of the present invention.

What is claimed is:
1. A dielectric substrate having thereon a metallization having a metal constituent consisting of finely divided particles of at least one member selected from the group consisting of gold, silver, platinum, palladium and alloys thereof, and containing nickel oxide, the ratio of nickel in the metallization, calculated as elemental nickel, to the total of gold, silver, platinum and palladium being in the range of about 1 to 9 to 1 to 4.
2. A multilayer ceramic capacitor having two or more electrodes formed from the metallization of claim 3.

* * * * *